(No Model.)
F. B. RAE.
SYSTEM OF ELECTRICAL DISTRIBUTION.
No. 437,512. Patented Sept. 30, 1890.
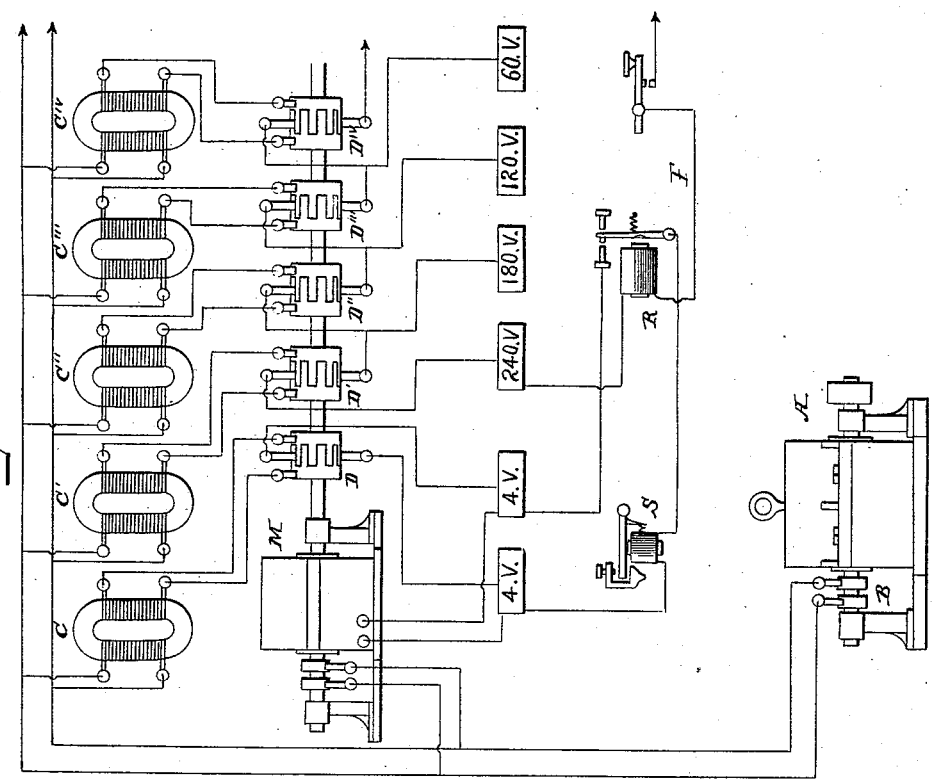
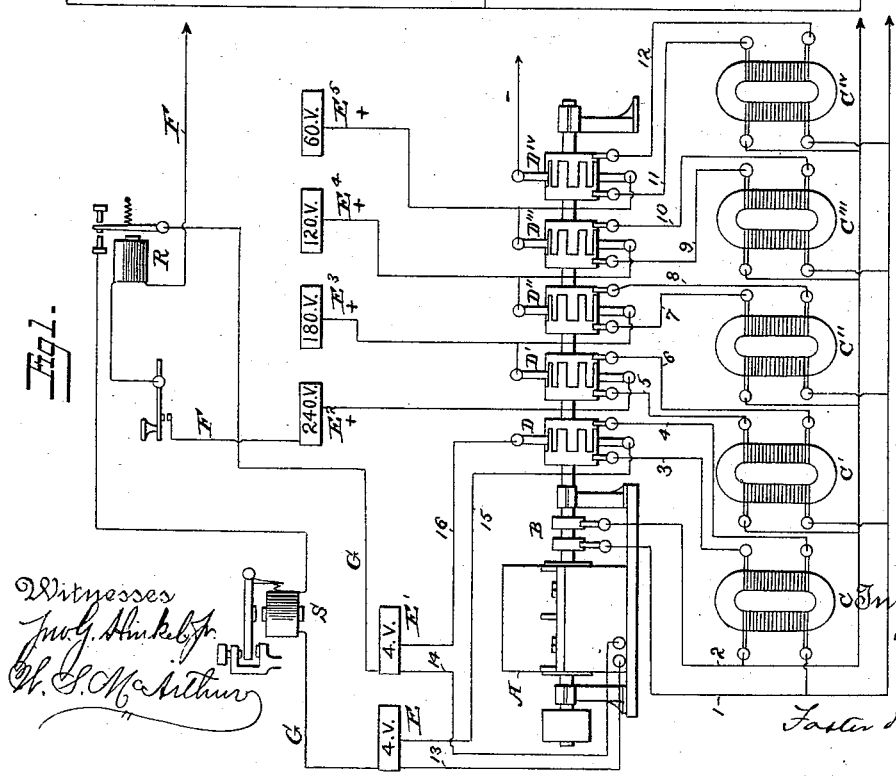
Witnesses
Inventor
F. B. Rae

UNITED STATES PATENT OFFICE.

FRANK B. RAE, OF CHICAGO, ILLINOIS, ASSIGNOR TO THE DETROIT ELECTRICAL WORKS, OF SAME PLACE.

SYSTEM OF ELECTRICAL DISTRIBUTION.

SPECIFICATION forming part of Letters Patent No. 437,512, dated September 30, 1890.

Application filed July 13, 1888. Serial No. 279,814. (No model.)

*To all whom it may concern:*

Be it known that I, FRANK B. RAE, a citizen of the United States, residing at Chicago, Cook county, State of Illinois, have invented certain new and useful Improvements in Systems of Electrical Distribution, of which the following is a full, clear, and exact specification.

This invention relates to systems of electric distribution, and has for its object to provide means whereby currents of various electromotive forces may be taken from a single electro-generator, which, currents may be in the form of continuous currents and entirely independent of each other, and may be utilized for various and different purposes and joined in different circuits, as circumstances may require.

It often happens that the electric currents derived from a generator or other source of electric energy are of too high electro-motive force for the desired purpose, or it may be that the currents are of too low electro-motive force, and it is desirable to provide means whereby currents of any desired electro-motive force may be obtained from the same source or generator, which currents may all be the same or of different electro-motive force and utilized for different purposes. The invention consists in providing means whereby this result may be accomplished substantially in the manner hereinafter more fully set forth.

Referring to the accompanying drawings, in Figure 1 I have illustrated diagrammatically a system of distribution involving my invention, and have shown it as applied particularly to telegraph systems; and in Fig. 2 I have shown a modified arrangement.

In carrying out my system I make use of an electric generator A, preferably of an alternating-current type, although it is not necessary to use such a generator, as any generator producing an interrupted or undulating current may be made use of. I prefer to use a generator having a considerable number of alternations, and the current from the armature of the generator is led to the commutator B, consisting of two disks $c\ c'$, mounted upon the shaft of the armature. From this commutator the current of the machine passes by means of the conductors 1 2 to the converters or transformers C C' C'' C''' C$^{iv}$, which are arranged in multiple-arc circuit from the generator. These transformers or converters may be of any desired construction, and are so arranged that they may be used to produce or convert any desired portion of the main current—in other words, to transform a portion of the main current having a given electro-motive force into a subsidary current having a greater or less electro-motive force, as is desired. In order to do this, it will be readily understood that it is only necessary to properly construct the converters, and if the ordinary induction-coil converter is used the relative size and proportion of the primary and secondary circuits may be so arranged as to accomplish this result. The current from these transformers is then conveyed by the conductors 3 4 5 6, &c., to straightening-commutators D D' D'', &c., which are shown in this instance mounted upon the shaft of the generator or so connected therewith that the straightening-commutators will rotate synchronously with the armature-shaft or with the coils thereon, so that the changes in the current from the transformer will coincide with the alternations or variations in the main current of the machine. While I prefer to operate these commutators from the same power that drives the generator, it will of course be understood that it is not absolutely necessary, as these straightening-commutators may be arranged at different points, although they are preferably operated synchronously with the generator. The straightened current from the respective straightening-commutators is then conducted to a switch-board E E' E², &c., and from this board may be lead the various telegraphic lines F G or other working-circuits, as desired. These various circuits may be used for various purposes, and I have shown, for instance, the converter C as adapted to produce or transform a portion of the main current into a current having a low electro-motive force—say about four volts—and this being conducted to the switch-board may be made use of by means of the conductors 13 14 to energize the field-magnets of the generator A, or, as indicated by the circuits 15 16, it may be used to operate one or more sounders S of the telegraph-circuit.

Other transformers may be made use of either to increase or decrease the electro-motive force of the current produced, so that it may be best utilized for the purpose desired—as, for instance, assuming that the generator produces a current of uniform strength, having an electro-motive force of five hundred volts, the converters C C′ C″ C‴, &c., may be utilized to produce or transform portions of this current into currents of four volts, one hundred volts, one hundred and fifty volts, or one thousand volts, and these transformed currents, after being properly straightened, may be connected to the various switch-boards and utilized to supply current to the telegraph or other circuits. In the operation of converters, however, it is well known that greater efficiency is had when the work done by them is very near their capacity. For this reason I prefer to make the electro-motive forces of the secondary coils of the several converters from which high potentials are desired about the same and to connect the straightened or commutated currents in series, obtaining the potentials of one, two, three, or more converters added together rather than to have one converter to give the sum of these several potentials. This manner of combining several potentials is shown in the drawings, in which it is arranged to furnish four potentials of a multiple of sixty volts. The — brush of commutator $D^{IV}$ is connected to ground. The opposite or + brush is connected with the — brush of commutator D‴ and to switch $E^5$, at which point a potential of sixty volts is had. The + brush of commutator D‴ is connected to the — brush of D″ and also with switch-plate $E^4$, from which point a potential of one hundred and twenty volts is obtained. In like manner the potentials from D″ and D′ are added, producing at $E^3$ one hundred and eighty volts and at $E^2$ two hundred and forty volts. This manner of combining the several potentials causes the converter $C^{IV}$ to carry all the current of the converters in the group. C‴ carries all the current required from D‴, D″, and D′, while C″ carries the current of D″ and D′.

From the above it will be seen that from a single source of electric energy, which is adapted to produce a current of a given strength and electro-motive force to the best possible advantage and with the greatest cheapness, currents of various electro-motive forces may be produced and straightened and thereby utilized to the best advantage for the purposes for which they are intended, and this is especially valuable in a large telegraphic system, where there are numerous lines of various lengths and capacities, requiring a various amount of power to properly operate them, and in this way the more powerful currents may be directed to the longer line and the weaker currents to the shorter lines, while sufficient current may also be transformed into currents of low electro-motive force to operate the local sounders or other receiving-instruments.

In Fig. 2 the same general arrangement is shown, except that in this case the dynamo or generator A is located at one point and the converters and straightening-commutators at another, and a motor M, operated by the current from the generator and revolving synchronously therewith, is employed to drive the shaft containing the straightening-commutators.

It is well known that an alternating motor properly constructed and supplied with a current from an alternating generator can be made to revolve in exact unison with the generator. I am therefore able to transfer an alternating current from a distant point to the point at which the several potentials are desired and to there convert and commutate or straighten the potentials for the purposes required.

While I have thus indicated the general principles of my invention and described a means of carrying it out, it will be evident to those skilled in the art that I am not limited to the precise arrangement and construction of parts shown, as they may be varied without departing from the principles of the invention.

What I claim is—

1. In a system of electric distribution, the combination, with the main circuit, of converters arranged to transform portions of said current into currents of varying electro-motive force, switch-boards connected in circuit with said converters, main-line telegraph-circuits connected with one of the switch-boards in the circuit having comparatively high electro-motive force, and local circuits connected with the switch-board in the circuit having comparatively low electro-motive force, substantially as described.

2. A system of electric distribution having an alternating-current generator, a main-line circuit leading therefrom, converters arranged in parallel in said circuit and adapted to transform portions of said main current into currents of varying electro-motive force, circuits leading from said converters to straightening-commutators operated in unison with the armature of the generator, circuits from each straightening-commutator to a separate switch-board, a local circuit from one of the switch-boards in a circuit of comparatively low electro-motive force, including the field-magnets of the generator, other local circuits from the same board, including the sounders or receiving-instruments, and telegraphic circuits connected with other switch-boards and adapted to be operated by currents of greater electro-motive force, substantially as described.

3. A system of electrical distribution having a main circuit, converters arranged to transform portions of said current into currents of varying electro-motive force, and switch-boards connected in circuit with said converters, whereby several straightened currents may be connected in series and the series circuit tapped at points of varying electro-motive force, substantially as described.

In testimony whereof I have signed my name to this specification in the presence of two subscribing witnesses.

FRANK B. RAE.

Witnesses:
 FORIE BAIN,
 A. P. LAUCKHARDT.